United States Patent
Honda et al.

(10) Patent No.: US 9,725,014 B2
(45) Date of Patent: Aug. 8, 2017

(54) VEHICLE

(71) Applicant: HONDA MOTOR CO., LTD., Tokyo (JP)

(72) Inventors: Tomokazu Honda, Utsunomiya (JP); Akiyoshi Kobayashi, Utsunomiya (JP); Shintaro Yoshimi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 14/440,419

(22) PCT Filed: Jul. 30, 2014

(86) PCT No.: PCT/JP2014/069998
§ 371 (c)(1),
(2) Date: May 4, 2015

(87) PCT Pub. No.: WO2015/016236
PCT Pub. Date: Feb. 5, 2015

(65) Prior Publication Data
US 2015/0283918 A1 Oct. 8, 2015

(30) Foreign Application Priority Data
Jul. 31, 2013 (JP) .................................. 2013-159612

(51) Int. Cl.
*B60L 15/20* (2006.01)
*B60K 6/52* (2007.10)
(Continued)

(52) U.S. Cl.
CPC ............ *B60L 15/2036* (2013.01); *B60K 6/52* (2013.01); *B60K 6/54* (2013.01); *B60K 7/00* (2013.01);
(Continued)

(58) Field of Classification Search
CPC ......... B60L 15/2036; B60K 6/52; B60K 6/54; B60K 7/00; B60K 17/348; B60K 17/356
See application file for complete search history.

(56) References Cited

U.S. PATENT DOCUMENTS 5,731,669 A 3/1998 Shimizu et al.
8,740,747 B2 6/2014 Tabata et al.
(Continued)

FOREIGN PATENT DOCUMENTS

CN 102448786 A 5/2012
DE 102011017464 A1 10/2012
(Continued)

OTHER PUBLICATIONS

Notice of Allowance dated Dec. 19, 2016, issued in U.S. Appl. No. 15/112,893. (19 pages).
(Continued)

*Primary Examiner* — Tony Winner
*Assistant Examiner* — Marlon A Arce
(74) *Attorney, Agent, or Firm* — Westerman, Hattori, Daniels & Adrian, LLP

(57) ABSTRACT

Provided is a vehicle that can improve vehicle posture control or operation performance during accelerating turn. A vehicle is provided with: a left drive wheel and a right drive wheel connected to a motor; a required drive power amount input device for inputting a required drive power amount; and a required turn amount input device for inputting a required turn amount. The vehicle further includes a turn control device that adjusts a power difference between the left drive wheel and the right drive wheel on the basis of a time derivative value of the required drive power amount in addition to the required turn amount.

13 Claims, 9 Drawing Sheets

(51) Int. Cl.

| | | |
|---|---|---|
| B60K 6/54 | (2007.10) | |
| B60K 7/00 | (2006.01) | |
| B60K 17/348 | (2006.01) | |
| B60K 17/356 | (2006.01) | |
| B60W 10/08 | (2006.01) | |
| B60W 10/16 | (2012.01) | |
| B60W 20/00 | (2016.01) | |
| B60W 30/045 | (2012.01) | |
| F16H 48/06 | (2006.01) | |
| F16H 48/22 | (2006.01) | |
| B60L 11/12 | (2006.01) | |
| B60L 11/14 | (2006.01) | |
| B62D 9/00 | (2006.01) | |
| G05D 1/02 | (2006.01) | |
| B60T 7/04 | (2006.01) | |

(52) U.S. Cl.
CPC .......... *B60K 17/348* (2013.01); *B60K 17/356* (2013.01); *B60L 11/123* (2013.01); *B60L 11/14* (2013.01); *B60T 7/042* (2013.01); *B60W 10/08* (2013.01); *B60W 10/16* (2013.01); *B60W 20/00* (2013.01); *B60W 30/045* (2013.01); *B62D 9/002* (2013.01); *F16H 48/06* (2013.01); *F16H 48/22* (2013.01); *G05D 1/021* (2013.01); *B60L 2210/40* (2013.01); *B60L 2220/44* (2013.01); *B60L 2240/12* (2013.01); *B60L 2240/24* (2013.01); *B60L 2240/421* (2013.01); *B60L 2240/423* (2013.01); *B60L 2240/441* (2013.01); *B60L 2240/443* (2013.01); *B60L 2250/26* (2013.01); *B60L 2260/28* (2013.01); *B60T 2201/14* (2013.01); *B60T 2201/16* (2013.01); *B60T 2220/04* (2013.01); *B60T 2230/02* (2013.01); *B60T 2270/303* (2013.01); *Y02T 10/6217* (2013.01); *Y02T 10/645* (2013.01); *Y02T 10/7077* (2013.01); *Y02T 10/7241* (2013.01); *Y02T 10/7275* (2013.01); *Y10S 903/906* (2013.01); *Y10S 903/909* (2013.01)

(56) References Cited

U.S. PATENT DOCUMENTS

| | | | |
|---|---|---|---|
| 2002/0010538 A1* | 1/2002 | Uchida | B60K 6/46 701/101 |
| 2005/0080532 A1 | 4/2005 | Kato et al. | |
| 2005/0217921 A1 | 10/2005 | Mori et al. | |
| 2006/0091727 A1 | 5/2006 | Motoyama | |
| 2006/0196714 A1* | 9/2006 | Sugimoto | B60K 6/52 180/242 |
| 2012/0015772 A1 | 1/2012 | Kira et al. | |
| 2013/0190986 A1 | 7/2013 | Nishimori | |
| 2014/0156127 A1 | 6/2014 | Ebert et al. | |

FOREIGN PATENT DOCUMENTS

| | | |
|---|---|---|
| EP | 0754588 A1 | 1/1997 |
| EP | 2497679 A2 | 9/2012 |
| JP | 4-129837 A | 4/1992 |
| JP | 09-089076 A | 3/1997 |
| JP | 10-016599 A | 1/1998 |
| JP | 2000-190863 A | 7/2000 |
| JP | 2002-29400 A | 1/2002 |
| JP | 2005-112285 A | 4/2005 |
| JP | 2005-137063 A | 5/2005 |
| JP | 2005-160262 A | 6/2005 |
| JP | 2005-219580 A | 8/2005 |
| JP | 2005-253175 A | 9/2005 |
| JP | 2005-289160 A | 10/2005 |
| JP | 2006-044293 A | 2/2006 |
| JP | 2006-117177 A | 5/2006 |
| JP | 2006-158149 A | 6/2006 |
| JP | 2007-269095 A | 10/2007 |
| JP | 2008-74328 A | 4/2008 |
| JP | 2008-100590 A | 5/2008 |
| JP | 2008-222055 A | 9/2008 |
| JP | 2008-222070 A | 9/2008 |
| JP | 2010-052523 A | 3/2010 |
| JP | 2010-052525 A | 3/2010 |
| JP | 2010-058691 A | 3/2010 |
| JP | 2010-101333 A | 5/2010 |
| JP | 2010-208366 A | 9/2010 |
| JP | 2011-131618 A | 7/2011 |
| JP | 2011-163518 A | 8/2011 |
| JP | 2012-166715 A | 9/2012 |
| JP | 2013-056636 A | 3/2013 |
| JP | 2014-101086 A | 6/2014 |
| JP | 2014-139039 A | 7/2014 |
| WO | 2014/115234 A1 | 7/2014 |
| WO | 2015/178119 A1 | 11/2015 |

OTHER PUBLICATIONS

International Search Report dated Oct. 28, 2014 issued in corresponding application No. PCT/JP2014/069998.
Related co-pending U.S. Appl. No. 15/112,893.
Related co-pending U.S. Appl. No. 15/119,853.
International Search Report dated Apr. 12, 2016, issued in International Application No. PCT/JP2016/054786. (4 pages).
Rejection of the Application dated Dec. 15, 2015, issued in counterpart Japanese Patent Application No. 2015-031112 of co-pending U.S. Appl. No. 14/440,419, w/English translation (4 pages).
Written Opinion dated Apr. 12, 2016, issued in International Application No. PCT/2016/054786. (10 pages).
International Search Report dated Apr. 26, 2016, issued in counterpart International Application No. PCT/JP2016/054783 in Japanese (4 pages).
European Search Report dated Feb. 9, 2017, issued in counterpart application No. 14832005.4.
Chinese Office Action and Search Report dated Apr. 20, 2017, issued in counterpart Chinese Patent Application No. 201480043314.8 with Machine and partial English Translations. (22 pages).

* cited by examiner

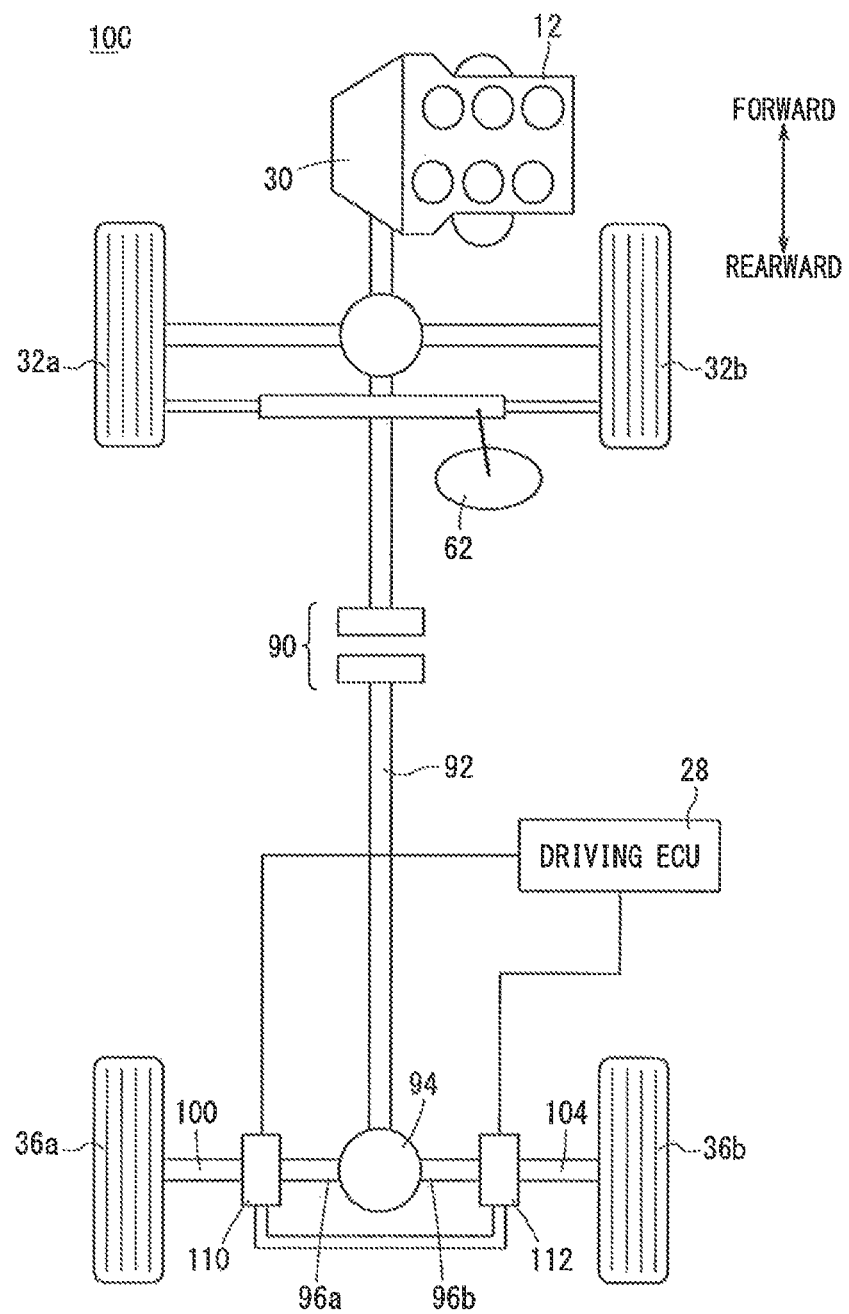

ably controlling the driving force distribution ratio for front and rear wheels, or the driving force distribution ratio for left and right front wheels or rear wheels ([0009], Abstract). According to US 2005/0217921 A1, in order to achieve this object, the driving force control method controls the driving force distribution ratio for the front and rear wheels in order to increase the driving force distribution ratio for the rear wheels, and also controls the driving force distribution ratio for the left and right front wheels or the rear wheels in order to increase the driving force for an outer wheel upon turning, depending on an increase in the absolute value of a lateral G signal. The lateral G signal is indicated by a control lateral G signal, which is generated by correcting a lateral G sensor signal with an estimated lateral G signal calculated on the basis of the vehicle speed and a steering angle of the vehicle (Abstract).

VEHICLE

TECHNICAL FIELD

The present invention relates to a vehicle that is capable of adjusting the driving forces of left and right wheels (drive wheels).

BACKGROUND ART

U.S. Patent Application Publication No. 2005/0217921 (hereinafter referred to as "US 2005/0217921 A1") has the object of providing a driving force control method for four-wheel-drive vehicles. The control method is capable of adequately controlling the driving force distribution ratio for front and rear wheels, or the driving force distribution ratio for left and right front wheels or rear wheels ([0009], Abstract). According to US 2005/0217921 A1, in order to achieve this object, the driving force control method controls the driving force distribution ratio for the front and rear wheels in order to increase the driving force distribution ratio for the rear wheels, and also controls the driving force distribution ratio for the left and right front wheels or the rear wheels in order to increase the driving force for an outer wheel upon turning, depending on an increase in the absolute value of a lateral G signal. The lateral G signal is indicated by a control lateral G signal, which is generated by correcting a lateral G sensor signal with an estimated lateral G signal calculated on the basis of the vehicle speed and a steering angle of the vehicle (Abstract).

Japanese Laid-Open Patent Publication No. 2005-219580 (hereinafter referred to as "JP 2005-219580 A") has the object of providing a vehicle behavior control apparatus, which is capable of suppressing a change in the behavior of a vehicle at the time that the vehicle starts to accelerate or decelerate while the vehicle is making a turn, thereby increasing vehicle stability ([0006], Abstract). In order to achieve this object, the behavior control apparatus 1 according to JP 2005-219580 A includes a drive means (electric motors 11FR through 11RL, [0024]) for applying individual driving forces respectively to a plurality of wheels 10FR through 10RL, a traveling state detecting means (lateral acceleration sensor 25, [0035]) for detecting a turning state of the vehicle V, and a driving force control means (motor ECU 20, [0032]) for controlling the drive means. The driving force control means controls the vehicle V so as to accelerate while the vehicle V is making a turn, and starts to apply a driving force to an outer wheel upon turning, and thereafter applies a driving force to an inner wheel during the turn (claim 3, [0052]).

With the behavior control apparatus 1 according to JP 2005-219580 A, when the vehicle V is accelerated while the vehicle is making a turn, a yaw moment is generated in the same direction as the direction of the turn, due to the fact that the driving force starts to be applied initially to the outer wheel during turning. It is claimed that a change in the behavior of the vehicle at the time that the vehicle starts to be accelerated can be suppressed, because the generated yaw moment cancels out a yaw moment that is generated in a direction opposite to the direction of the turn as the vehicle is accelerated ([0012]).

It is assessed whether or not the vehicle V is in a turning state on the basis of whether the lateral acceleration, which is detected by the lateral acceleration sensor 25, is equal to or greater than a predetermined value ([0034], [0035]).

According to JP 2005-219580 A, the driving force control means controls the drive means to start applying the driving force to the outer wheel upon turning, and thereafter applies the driving force to the inner wheel during the turn, provided that the absolute value of a rate of change of an accelerator pedal opening (rate of change |dAcc/dt|) is equal to or greater than a predetermined value TH1, and further provided that the absolute value of the difference between a preceding readout value of the accelerator pedal opening and a present readout value of the accelerator pedal opening (difference |ΔAcc|) is equal to or greater than a predetermined value TH2 (FIG. 3, step S106: YES) ([0037]). It further is stated that only one of these conditions, i.e., one of the rate of change |dAcc/dt| and the difference |ΔAcc|, may be used ([0037]).

SUMMARY OF INVENTION

As described above, JP 2005-219580 A focuses on the absolute value of the rate of change of the accelerator pedal opening (rate of change |dAcc/dt|). However, the rate of change |dAcc/dt| is used only as one condition for the drive means to start applying the driving force to the outer wheel upon turning, and thereafter applying the driving force to the inner wheel during the turn.

The rate of change |dAcc/dt| of the accelerator pedal opening is directly indicative of an accelerator pedal operation, i.e., an intention of the driver to accelerate or decelerate the vehicle (or a future accelerated or decelerated state of the vehicle). However, nothing is disclosed or suggested in JP 2005-219580 A concerning changing a wheel torque depending on the rate of change |dAcc/dt| itself. Stated otherwise, JP 2005-219580 A is silent concerning a concept of controlling the behavior of the vehicle in direct association with an accelerator pedal operation (or a requested amount of drive power for the vehicle). Consequently, JP 2005-219580 A has room for improvement in relation to attitude control or operability performance (response to an accelerator pedal operation) for the vehicle at the time that the vehicle is making a turn. Further, US 2005/0217921 A1 does not disclose or suggest anything in this regard.

The present invention has been made in view of the aforementioned problems. An object of the present invention is to provide a vehicle, which is capable of improving attitude control or operability performance for a vehicle at the time that the vehicle is accelerating while making a turn.

According to the present invention, a vehicle is provided, comprising a left drive wheel and a right drive wheel that are connected to a prime mover, a requested-amount-of-drive-power input device configured to input a requested amount of drive power, a requested-amount-of-turn input device configured to input a requested amount of turn, and a turn control apparatus configured to adjust a power difference between the left drive wheel and the right drive wheel on a basis of a time differential of the requested amount of drive power in addition to the requested amount of turn.

According to the present invention, the power difference between the left drive wheel and the right drive wheel is adjusted on the basis of the time differential of the requested amount of drive power and the requested amount of turn. Therefore, even if the requested amount of turn remains the same, the power difference between the left and right drive wheels varies depending on the requested amount of drive power. Consequently, if the power difference between the left and right drive wheels is increased as the time differential of the requested amount of drive power becomes higher, it is easier for the vehicle (vehicle body) to make a turn in a stable manner. In particular, such a feature is manifested in a low speed range in which the responsiveness of the behavior of the vehicle to a steering action is low. Consequently, the above control process makes it possible to stabilize the vehicle, or to increase the responsiveness of the behavior of the vehicle to the intentions (high-speed turning) of the driver.

The turn control apparatus may increase the power difference as the time differential of the requested amount of drive power becomes greater. Alternatively, the turn control apparatus may reduce the power difference as the time differential of the requested amount of drive power becomes greater.

The prime mover may include a first prime mover connected to the left drive wheel, and a second prime mover connected to the right drive wheel. In addition, the turn control apparatus may control power of the first prime mover and the second prime mover in order to adjust the power difference on a basis of the time differential of the requested amount of drive power. With such an arrangement, the power of the first prime mover and the power of the second prime mover are controlled to thereby adjust the power difference between the left and right drive wheels. Since the prime movers are connected respectively to the left and right drive wheels, it is possible to individually control the outputs of the left and right drive wheels.

The first prime mover and the second prime mover may comprise electric motors, respectively, configured to generate power in a forward direction and generating power in a reverse direction of the vehicle. The turn control apparatus may control one of the first prime mover and the second prime mover, which corresponds to an outer one of the wheels while the vehicle is making a turn, in order to generate power in the forward direction, and further may control one of the first prime mover and the second prime mover, which corresponds to an inner one of the wheels while the vehicle is making the turn, in order to generate power in the reverse direction and thereby adjust the power difference.

With the above arrangement, in the turn control apparatus, the power difference between the left and right drive wheels is adjusted by the first prime mover and the second prime mover, which are connected respectively to the left and right drive wheels. Generally, several electric motors are arranged such that the torques thereof can be controlled with high responsiveness and high resolution. Consequently, the above arrangement makes it possible to generate the power difference between the left and right drive wheels with high responsiveness and high resolution.

One of the first prime mover and the second prime mover, which corresponds to an outer wheel, is caused to generate power in the forward direction of the vehicle. In addition, one of the first prime mover and the second prime mover, which corresponds to an inner wheel, is caused to generate power in the reverse direction of the vehicle. Accordingly, the power difference between the left drive wheel and the right drive wheel can be adjusted. Thus, it is possible to establish the power difference flexibly, without being subjected to a limitation in which the power of both the left and right drive wheels must be in a forward direction (i.e., of positive values). Consequently, it is possible to further enhance attitude control or operational performance of the vehicle depending on the situation that the vehicle is in.

Alternatively, the prime mover and the left drive wheel may be connected to each other through a first power transmitting mechanism, and the prime mover and the right drive wheel may be connected to each other through a second power transmitting mechanism. In this case, the turn control apparatus may control the first power transmitting mechanism and the second power transmitting mechanism in order to adjust the power difference on a basis of the time differential of the requested amount of drive power. In this manner, it is possible to adjust the power difference between the left and right drive wheels without being required to wait for a change in the output of the engine based on the time differential of the requested amount of drive power.

The first power transmitting mechanism may include a first engaging and disengaging unit configured to switch between an engaged state, for transmitting power between the prime mover and the left drive wheel, and a disengaged state, for cutting off transmission of power between the prime mover and the left drive wheel. The second power transmitting mechanism may include a second engaging and disengaging unit configured to switch between an engaged state, for transmitting power between the prime mover and the right drive wheel, and a disengaged state, for cutting off transmission of power between the prime mover and the right drive wheel. In addition, the turn control apparatus may control the first engaging and disengaging unit and the second engaging and disengaging unit in order to switch between the engaged state and the disengaged state, to thereby adjust the power difference on a basis of the time differential of the requested amount of drive power.

With the above arrangement, by controlling engagement and disengagement of the first engaging and disengaging unit and the second engaging and disengaging unit, the turn control apparatus is capable of adjusting the power difference between the left and right drive wheels. Thus, it is possible to adjust the power difference between the left and right drive wheels, by engaging and disengaging the first engaging and disengaging unit and the second engaging and disengaging unit. Therefore, it is possible to generate the power difference with high responsiveness.

Assuming that the time differential of the requested amount of drive power is constant, the turn control apparatus may make the power difference smaller when the rotational speed of the left drive wheel is high rather than when the rotational speed of the left drive wheel is low, or when the rotational speed of the right drive wheel is high rather than when the rotational speed of the right drive wheel is low.

With the above arrangement, if the vehicle speed is high, the power difference between the left and right drive wheels is reduced based on the time differential of the requested amount of drive power. Therefore, it is possible to prevent the behavior of the vehicle from becoming unstable due to the power difference between the left and right drive wheels being generated excessively when the vehicle speed is high.

Assuming that the time differential of the requested amount of drive power is constant, the turn control apparatus may make the power difference smaller when the requested amount of turn is small rather than when the requested amount of turn is large. With such an arrangement, if the requested amount of turn is small, the power difference between the left and right drive wheels is reduced based on the time differential of the requested amount of drive power. Therefore, if the steering wheel is turned out of control by a rolling surface or a rut in the road, or if the driver turns the steering wheel through a small angle, it is possible to prevent the behavior of the vehicle from being disturbed due to excessive generation of the power difference between the left and right drive wheels.

The turn control apparatus may calculate an additive power, which is added to power of an outer one of the left drive wheel and the right drive wheel while the vehicle is making a turn, and a subtractive power, which is subtracted from power of an inner one of the left drive wheel and the right drive wheel while the vehicle is making the turn, on a basis of the time differential of the requested amount of drive power. In addition, the turn control apparatus may make an absolute value of the additive power and the absolute value of the subtractive power equal to each other. With such an arrangement, it is possible to adjust the power difference between the left and right drive wheels without changing the power (total value) generated by the prime movers, thereby preventing the driver from feeling uneasy and uncomfortable as a result of a change in the power (total value) of the prime movers upon adjustment of the power difference.

If the first prime mover and the second prime mover comprise electric motors, respectively, configured to generate power in a forward direction and generating power in a reverse direction of the vehicle, the vehicle may further include an electric energy storage device, which is connected electrically to the electric motors.

The vehicle may further comprise a differential mechanism configured to distribute power from the prime mover to the left drive wheel and the right drive wheel. In this case, the first power transmitting mechanism may be disposed between the left drive wheel and the differential mechanism, and the second power transmitting mechanism may be disposed between the right drive wheel and the differential mechanism.

Alternatively, the vehicle may further comprise a differential mechanism configured to distribute power from the prime mover to the left drive wheel and the right drive wheel, a first redistribution mechanism configured to transmit part or all of the power distributed to the left drive wheel by the differential mechanism to the right drive wheel, and a second redistribution mechanism configured to transmit part or all of the power distributed to the right drive wheel by the differential mechanism to the left drive wheel. In this case, the turn control apparatus may control the first redistribution mechanism and the second redistribution mechanism in order to adjust the power difference on a basis of the time differential of the requested amount of drive power.

BRIEF DESCRIPTION OF DRAWINGS

FIG. 9 is a schematic diagram showing a drive system and peripheral components of a vehicle according to a third modification of the present invention.

DESCRIPTION OF EMBODIMENTS

I. Embodiment

A. Arrangement

A-1. Drive System of Vehicle 10

Figure 1:
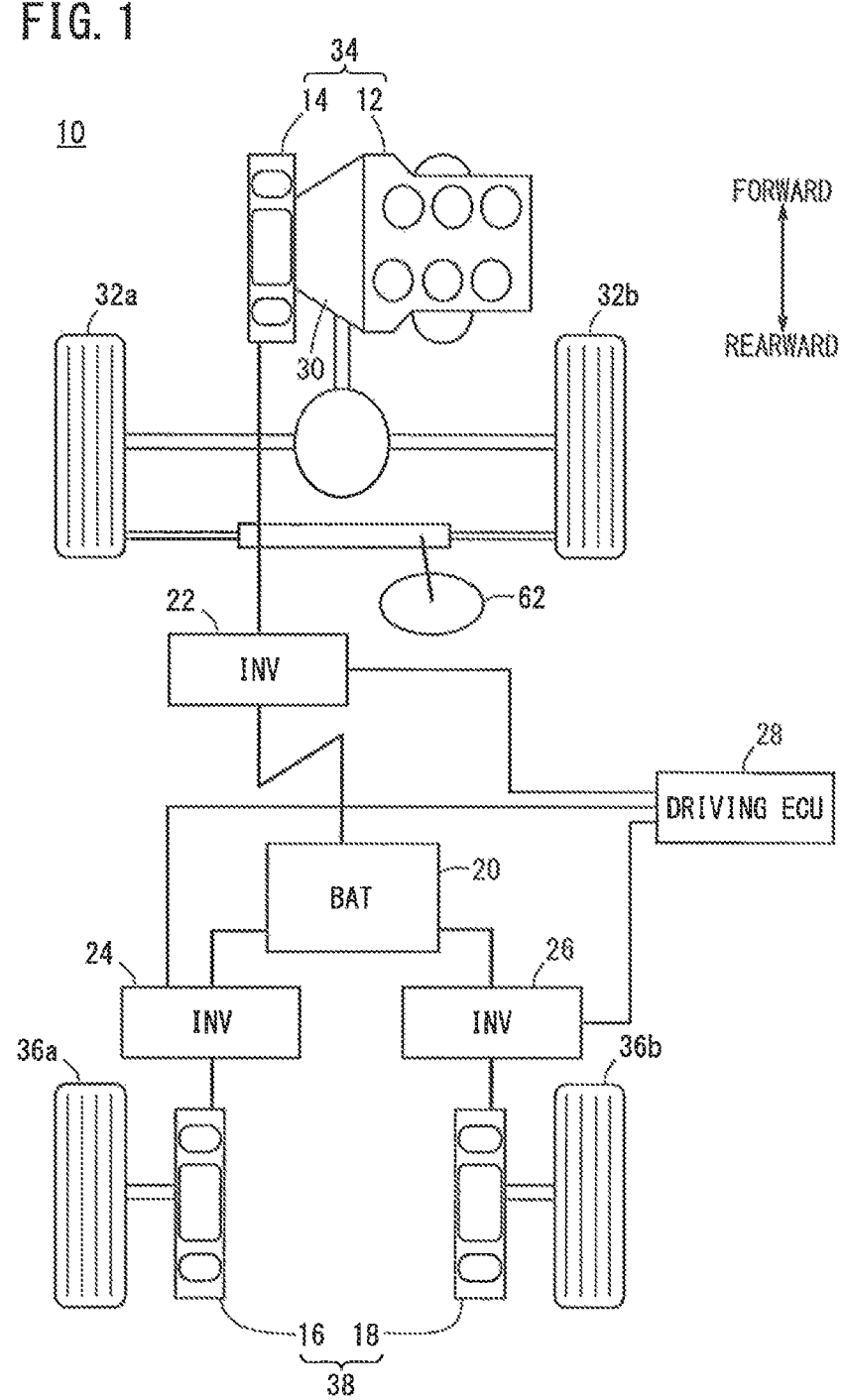
FIG. 1 is a schematic diagram showing a drive system and peripheral components of a vehicle according to an embodiment of the present invention.

FIG. 1 is a schematic diagram showing a drive system and peripheral components of a vehicle 10 according to an embodiment of the present invention. As shown in FIG. 1, the vehicle 10 includes an engine 12 and a first traction motor 14, which are arranged in series in a front region of the vehicle 10, a second traction motor 16 and a third traction motor 18, which are arranged in a rear region of the vehicle 10, a high-voltage battery 20 (hereinafter also referred to as "battery 20"), first through third inverters 22, 24, 26, and a driving electronic control unit 28 (hereinafter referred to as a "driving ECU 28").

The first traction motor 14 will hereinafter be also referred to as a "first motor 14" or a "front motor 14". The second traction motor 16 will hereinafter be also referred to as a "second motor 16", a "rear first motor 16", a "rear motor 16", or a "left rear motor 16". The third traction motor 18 will hereinafter be also referred to as a "third motor 18", a "rear second motor 18", a "rear motor 18", or a "right rear motor 18".

The engine 12 and the first motor 14 transmit driving forces (hereinafter referred to as "front wheel driving forces Ff") to a left front wheel 32a and a right front wheel 32b (hereinafter referred to collectively as "front wheels 32") through a transmission 30. The engine 12 and the first motor 14 make up a front wheel driving apparatus 34. For example, when the vehicle 10 is under a low load, the vehicle 10 is driven by only the first motor 14, when the vehicle 10 is under a medium load, the vehicle 10 is driven by only the engine 12, and when the vehicle 10 is under a high load, the vehicle 10 is driven by the engine 12 and the first motor 14.

An output shaft of the second motor 16 is connected to the rotational shaft of a left rear wheel 36a, and transmits a driving force to the left rear wheel 36a. An output shaft of the third motor 18 is connected to the rotational shaft of a right rear wheel 36b, and transmits a driving force to the right rear wheel 36b. The second motor 16 and the third motor 18 make up a rear wheel driving apparatus 38. The front wheel driving apparatus 34 and the rear wheel driving apparatus 38 are not connected mechanically to each other, but are disposed independently of each other. The left rear wheel 36a and the right rear wheel 36b will hereinafter be referred to collectively as "rear wheels 36". Driving forces transmitted from the rear wheel driving apparatus 38 to the rear wheels 36 are referred to as rear wheel driving forces Fr.

A high-voltage battery 20 supplies electric power through the first through third inverters 22, 24, 26 to the first through third motors 14, 16, 18. The high-voltage battery 20 is charged with regenerated electric power Preg from the first through third motors 14, 16, 18.

On the basis of output signals from various sensors and various electronic control units (hereinafter referred to as "ECUs"), the driving ECU 28 controls the engine 12 and the first through third inverters 22, 24, 26 to thereby control output power from the engine 12 and the first through third motors 14, 16, 18. The driving ECU 28 has an input/output unit, a processor, and a memory, none of which are shown. The driving ECU 28 may comprise a combination of ECUs. For example, the driving ECU 28 may be made up from a plurality of ECUs, which are associated respectively with the engine 12 and the first through third motors 14, 16, 18, and an ECU for managing driven states of the engine 12 and the first through third motors 14, 16, 18.

The engine 12 is a six-cylinder engine, for example, but may be a two-cylinder engine, a four-cylinder engine, an eight-cylinder engine, or any of various other engine types. The engine 12 is not limited to a gasoline engine, but may be an engine such as a diesel engine, an air engine, or the like.

Each of the first through third motors 14, 16, 18 comprises a three-phase AC brushless motor, for example. However, each of the first through third motors 14, 16, 18 may be a three-phase AC brush motor, a single-phase AC motor, a DC motor, or any of various other motor types. The first through third motors 14, 16, 18 may have the same specifications, or may have different specifications from each other. Any of the first through third motors 14, 16, 18 according to the present embodiment is capable of rotating in a normal direction (rotating to propel the vehicle 10 forwardly) and is capable of rotating in a reverse direction (rotating to propel the vehicle 10 rearwardly).

The first through third inverters 22, 24, 26, which are of a three-phase bridge configuration, convert direct current into three-phase alternating currents, and supply the three-phase alternating currents to the first through third motors 14, 16, 18. In addition, the first through third inverters 22, 24, 26 supply direct current, which is converted from alternating currents that are regenerated by the first through third motors 14, 16, 18, to the high-voltage battery 20.

The high-voltage battery 20 serves as an electric energy storage device including a plurality of battery cells. The high-voltage battery 20 may be a lithium ion secondary battery, a nickel hydrogen secondary battery, a capacitor, or the like. According to the present embodiment, the high-voltage battery 20 comprises a lithium ion secondary battery. DC/DC converters may be connected between the first through third inverters 22, 24, 26 and the high-voltage battery 20, for stepping up or stepping down an output voltage from the high-voltage battery, or output voltages from the first through third motors 14, 16, 18.

The drive system of the vehicle 10 may be of the same configuration as the drive system disclosed in U.S. Patent Application Publication No. 2012/0015772, for example.

A-2. Configuration of Driving ECU 28 (Functional Blocks)

2-1. Overview

Figure 2:
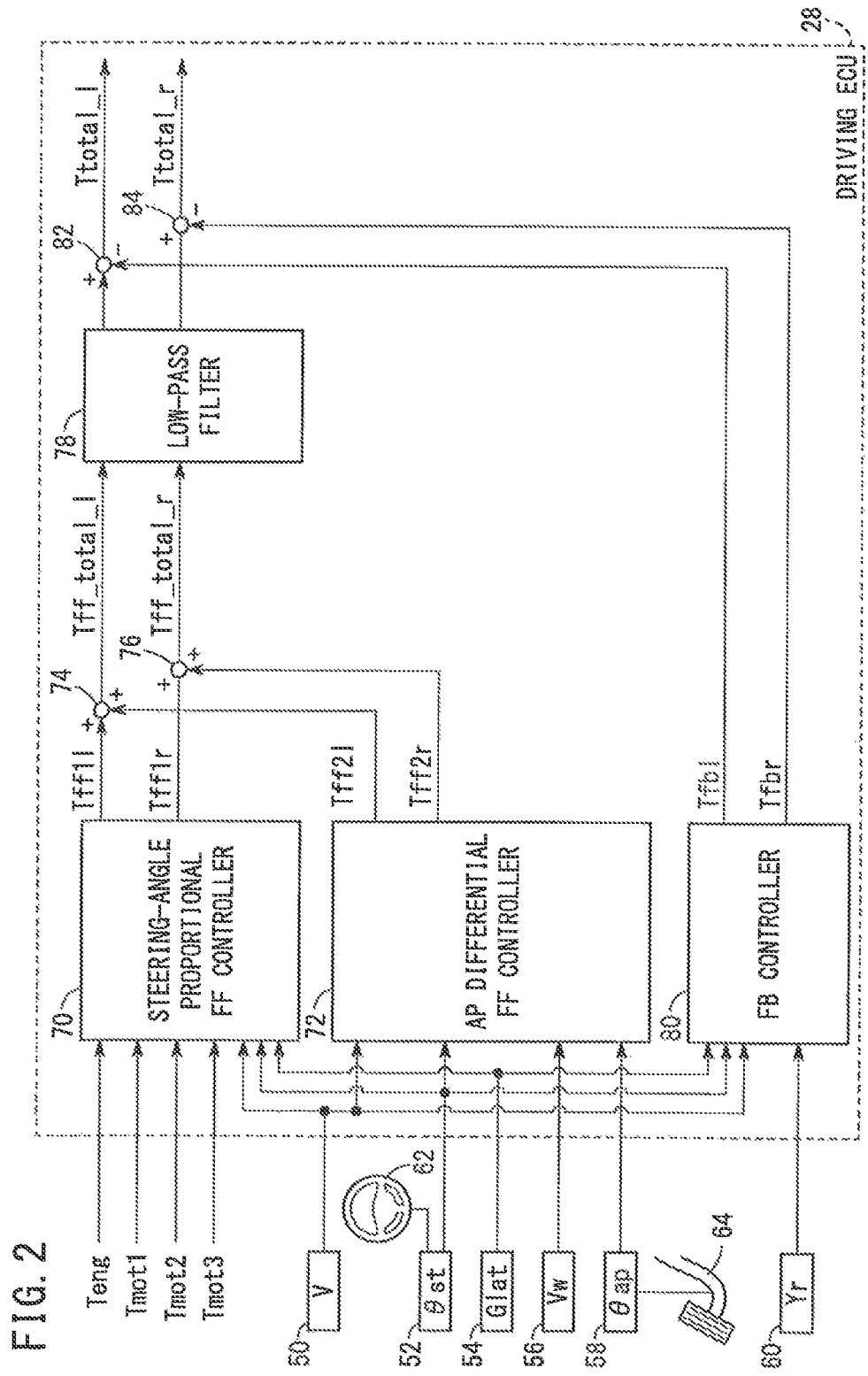
FIG. 2 is a block diagram showing various sensors and functional blocks of a driving electronic control unit.
Figure 3:
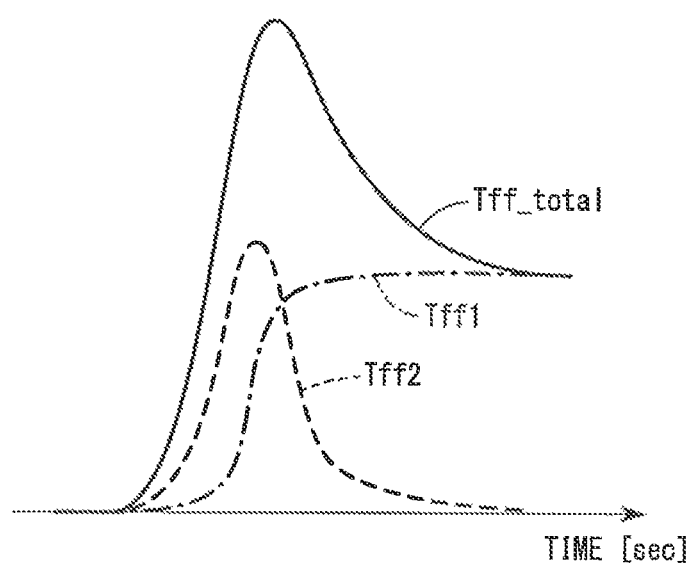
FIG. 3 is a diagram showing, by way of example, a torque for feed-forward control with respect to an outer one of left and right rear wheels upon turning.

FIG. 2 is a block diagram showing various sensors and functional blocks of the driving ECU 28. FIG. 3 is a diagram showing, by way of example, a torque for a feed-forward control with respect to an outer one of the left and right rear wheels 36a, 36b upon turning. The driving ECU 28 is programmed to perform the functions of the functional blocks illustrated in FIG. 2. If necessary, however, a portion of the driving ECU 28 may be replaced with analog circuits or digital circuits.

As shown in FIG. 2, the vehicle 10 includes a vehicle speed sensor 50, a steering angle sensor 52, a lateral acceleration sensor 54 (hereinafter referred to as a "lateral G sensor 54"), a wheel speed sensor 56, an accelerator pedal opening sensor 58 (hereinafter referred to as an "AP opening sensor 58"), and a yaw rate sensor 60.

The driving ECU 28 also includes a steering-angle proportional feed-forward controller 70 (hereinafter referred to as a "steering-angle proportional FF controller 70" or an "FF controller 70"), an accelerator-pedal differential feed-forward controller 72 (hereinafter referred to as an "AP differential FF controller 72" or an "FF controller 72"), a first adder 74, a second adder 76, a low-pass filter 78, a feedback controller 80 (hereinafter referred to as an "FB controller 80"), a first subtractor 82, and a second subtractor 84.

2-2. Various Sensors

The vehicle speed sensor 50 detects a vehicle speed V [km/h] of the vehicle 10, and outputs the detected vehicle speed V to the FF controllers 70, 72 and the FB controller 80. The steering angle sensor 52 detects a steering angle θst [degrees] of a steering wheel 62, and outputs the detected steering angle θst to the FF controllers 70, 72 and the FB controller 80. The lateral G sensor 54 detects a lateral acceleration Glat [m/s$^2$] of the vehicle 10 (vehicle body), and outputs the detected lateral acceleration Glat to the FF controller 70 and the FB controller 80.

The wheel speed sensor 56 detects rotational speeds of the respective wheels 32a, 32b, 36a, 36b (hereinafter referred to as "wheel speeds Vwfl, Vwfr, Vwrl, Vwrr") (also referred to collectively as "wheel speeds Vw"), and outputs the detected wheel speeds Vw to the FF controller 72. The AP opening sensor 58 detects an opening θap of an accelerator pedal 64 (hereinafter referred to as an "accelerator pedal opening θap" or an "AP opening θap"), and outputs the detected AP opening θap to the FF controller 72. The accelerator pedal 64 is not limited to a pedal by which a request is made for driving the vehicle 10 (controlling driving forces), but may be a pedal that serves both for making a request for driving the vehicle 10 and a request for braking the vehicle 10 (controlling driving forces and braking forces). The yaw rate sensor 60 detects a yaw rate Yr of the vehicle 10 (vehicle body), and outputs the detected yaw rate Yr to the FB controller 80.

2-3. Functional Blocks of Driving ECU 28

2-3-1. Steering-Angle Proportional FF Controller 70

The steering-angle proportional FF controller 70 carries out a steering-angle proportional feed-forward control process (hereinafter referred to as a "steering-angle proportional FF control process"). The steering-angle proportional FF control process controls torques (driving forces) of the drive wheels (rear wheels 36a, 36b) depending on the steering angle θst and the lateral acceleration Glat.

More specifically, the FF controller 70 calculates a steering-angle proportional torque Tff1l for the left rear wheel 36a, and outputs the calculated steering-angle proportional torque Tff1l to the first adder 74. In addition, the FF controller 70 calculates a steering-angle proportional torque Tff1r for the right rear wheel 36b, and outputs the calculated steering-angle proportional torque Tff1r to the second adder 76. The steering-angle proportional torques Tff1l, Tff1r will hereinafter be referred to collectively as "steering-angle proportional torques Tff1" or "torques Tff1". FIG. 3 shows, by way of example, a torque Tff1 with respect to an outer one of the left and right rear wheels 36a, 36b.

Figure 5:
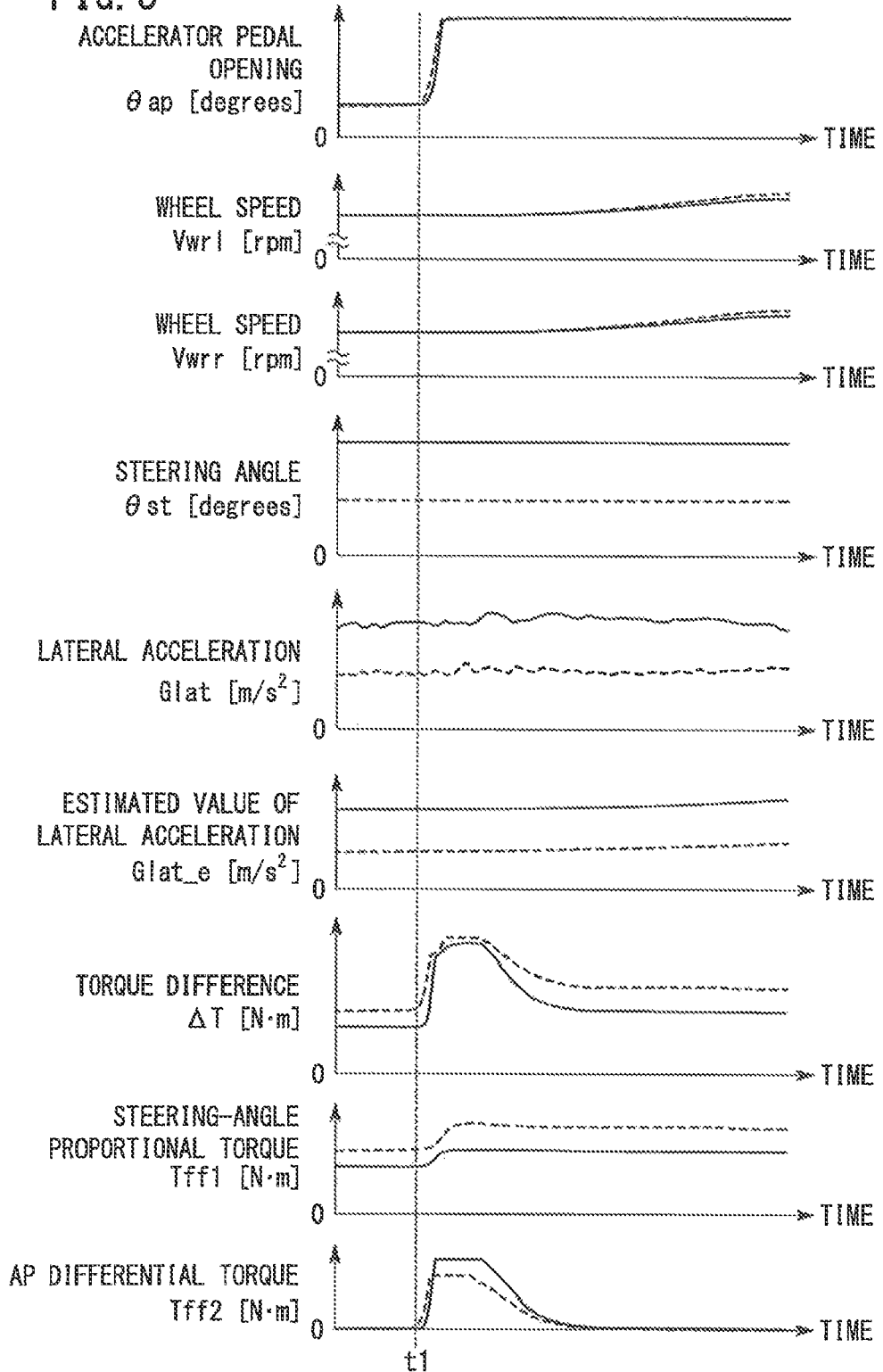
FIG. 5 is a diagram showing, by way of example, various data that are produced when the AP differential FF control process shown in FIG. 4 is carried out.

The FF controller 70 calculates torques Tff1 using the same configuration and processes as those of the feed-forward controller disclosed in US 2005/0217921 A1 (denoted by reference numeral 84 in FIG. 5 of US 2005/0217921 A1).

More specifically, the FF controller 70 calculates wheel driving forces F for the rear wheels 36a, 36b on the basis of the torque of the engine 12 (engine torque Teng) and the torques of the first through third motors 14, 16, 18 (first through third motor torques Tmot1, Tmot2, Tmot3).

The FF controller 70 calculates an estimated value of the lateral acceleration Glat (estimated lateral acceleration Glat_e) on the basis of the vehicle speed V from the vehicle speed sensor 50 and the steering angle θst from the steering angle sensor 52. The FF controller 70 calculates a corrected value of the lateral acceleration Glat (corrected lateral acceleration Glat_c), which is indicated by the sum of the estimated lateral acceleration Glat_e and the lateral acceleration Glat (measured value) from the lateral G sensor 54.

Then, based on the corrected lateral acceleration Glat_c, the FF controller 70 determines which one of the left and right rear wheels 36a, 36b is the outer wheel. Further, based on the corrected lateral acceleration Glat_c, the FF controller 70 calculates a front-and-rear distribution ratio and a left-and-right distribution ratio. Then, on the basis of the determined outer wheel and the calculated front-and-rear distribution ratio and left-and-right distribution ratio, the FF controller 70 calculates an outer-wheel/inner-wheel torque distribution ratio for the rear wheels 36a, 36b.

Next, the FF controller 70 calculates steering-angle proportional torques Tff1*l*, Tff1*r* by multiplying the wheel driving forces F for the rear wheels 36a, 36b by a proportion that is based on the outer-wheel/inner-wheel torque distribution ratio.

2-3-2. AP Differential FF Controller 72

The AP differential FF controller 72 carries out an accelerator-pedal differential feed-forward control process (hereinafter referred to as an "AP differential FF control process"). The AP differential FF control process controls torques (driving forces) of the drive wheels (rear wheels 36a, 36b) depending on a rate of change Vap [degrees/sec], which is indicated as a time differential of the accelerator pedal opening θap.

More specifically, the FF controller 72 calculates an accelerator-pedal differential torque Tff2*l* (hereinafter referred to as an "AP differential torque Tff2*l*") for the left rear wheel 36a, outputs the calculated AP differential torque Tff2*l* to the first adder 74, calculates an accelerator-pedal differential torque Tff2*r* (hereinafter referred to as an "AP differential torque Tff2*r*") for the right rear wheel 36b, and outputs the calculated AP differential torque Tff2*r* to the second adder 76. The AP differential torques Tff2*l*, Tff2*r* will hereinafter be referred to collectively as "AP differential torques Tff2" or "torques Tff2". FIG. 3 shows, by way of example, a torque Tff2 with respect to an outer one of the left and right rear wheels 36a, 36b.

The FF controller 72 primarily calculates a torque Tff2 on the basis of the rate of change Vap of the AP opening θap. The torque Tff2 serves to establish a torque difference ΔT [N·m] between the left and right rear wheels 36a, 36b depending on the rate of change Vap. The torque difference ΔT is the difference between the respective torques (in this case, target values) of the left and right rear wheels 36a, 36b.

Details of the AP differential FF control process will be described later with reference to the flowchart of FIG. 4.

2-3-3. First Adder 74 and Second Adder 76

The first adder 74 calculates the sum of the torque Tff1*l* from the FF controller 70 and the torque Tff2*l* from the FF controller 72 (hereinafter referred to as a "feed-forward total torque Tff_total_l" or an "FF total torque Tff_total_l").

The second adder 76 calculates the sum of the torque Tff1*r* from the FF controller 70 and the torque Tff2*r* from the FF controller 72 (hereinafter referred to as a "feed-forward total torque Tff_total_r" or an "FF total torque Tff_total_r").

Hereinafter, the FF total torque Tff_total_l and the FF total torque Tff_total_r will be referred to collectively as "FF total torques Tff_total" or "torques Tff_total". FIG. 3 shows, by way of example, a torque Tff_total with respect to an outer one of the left and right rear wheels 36a, 36b.

2-3-4. Low-Pass Filter 78

The low-pass filter 78 passes only low-frequency components of the FF total torque Tff_total_l for the left rear wheel 36a, and outputs the low-frequency components to the first subtractor 82. Similarly, the low-pass filter 78 passes only low-frequency components of the FF total torque Tff_total_r for the right rear wheel 36b, and outputs the low-frequency components to the second subtractor 84. In this manner, it is possible to avoid an abrupt change in the FF total torque Tff_total. As a result, it is possible to prevent the driver of the vehicle 10 from feeling uneasy and uncomfortable due to a sharp rise in the AP differential torques Tff2.

2-3-5. FB Controller 80

The FB controller 80 carries out a feedback control process (hereinafter referred to as an "FB control process"). The FB control process controls the torques (driving forces) of the drive wheels (in this case, the rear wheels 36a, 36b) in order to prevent the drive wheels from slipping while the vehicle 10 is making a turn.

More specifically, the FB controller 80 calculates a feedback torque Tfbl (hereinafter also referred to as an "FB torque Tfbl") for the left rear wheel 36a, outputs the calculated FB torque Tfbl to the first subtractor 82, calculates a feedback torque Tfbr (hereinafter also referred to as an "FB torque Tfbr") for the right rear wheel 36b, and outputs the calculated FB torque Tfbr to the second subtractor 84. Hereinafter, the FB torques Tfbl, Tfbr will be referred to collectively as "FB torques Tfb" or "torques Tfb".

The FB controller 80 calculates the torques Tfb using the same configuration and processes as those of the feedback controller disclosed in US 2005/0217921 A1 (denoted by reference numeral 86 in FIG. 5 of US 2005/0217921 A1).

More specifically, the FB controller 80 calculates a slip angle of the vehicle 10 on the basis of the vehicle speed V detected by the vehicle speed sensor 50, the steering angle θst detected by the steering angle sensor 52, the lateral acceleration Glat detected by the lateral G sensor 54, and the yaw rate Yr detected by the yaw rate sensor 60. The FB controller 80 also calculates a slip angle threshold value on the basis of the vehicle speed V detected by the vehicle speed sensor 50, and the lateral acceleration Glat detected by the lateral G sensor 54.

The FB controller 80 calculates FB torques Tfbl, Tfbr in order to calculate a reduction on the rear wheel torques and a reduction in the outer wheel torque, on the basis of the difference between the slip angle and the slip angle threshold value. More specifically, when the slip angle of the vehicle 10 is greater than a predetermined value, the FB controller 80 determines that the vehicle 10 is in an unstable state, and calculates the FB torques Tfbl, Tfbr in order to reduce the rear wheel distribution torques and the outer wheel distribution torque.

2-3-6. First Subtractor 82 and Second Subtractor 84

The first subtractor 82 calculates the difference between the FF total torque Tff_total_l from the low-pass filter 78 and the FB torque Tfbl from the FB controller 80 (hereinafter referred to as a "total torque Ttotal_l" or a "torque Ttotal_l"). The second subtractor 84 calculates the difference between the FF total torque Tff_total_r from the low-pass filter 78 and the FB torque Tfbr from the FB controller 80 (hereinafter referred to as a "total torque Ttotal_r" or a "torque Ttotal_r"). Hereinafter, the total torques Ttotal_l, Ttotal_r will be referred to collectively as "total torques Ttotal" or "torques Ttotal".

2-4. Outputs of Driving ECU 28 (Torques Tff1, Tff2, Tff_Total)

FIG. 3 shows, by way of example, the steering-angle proportional torque Tff1, the AP differential torque Tff2, and the FF total torque Tff_total, with respect to an outer one of the left and right rear wheels 36a, 36b. As shown in FIG. 3, when the accelerator pedal 64 is depressed, the steering-angle proportional torque Tff1 and the AP differential torque Tff2 are increased. At this time, the steering-angle proportional torque Tff1 rises comparatively slowly. Therefore, by adding the AP differential torque Tff2, which rises more quickly than the steering-angle proportional torque Tff1, it is possible to make the FF total torque Tff_total rise quickly as a whole.

B. AP Differential FF Control Process

B-1. Flow of AP Differential FF Control Process

Figure 4:
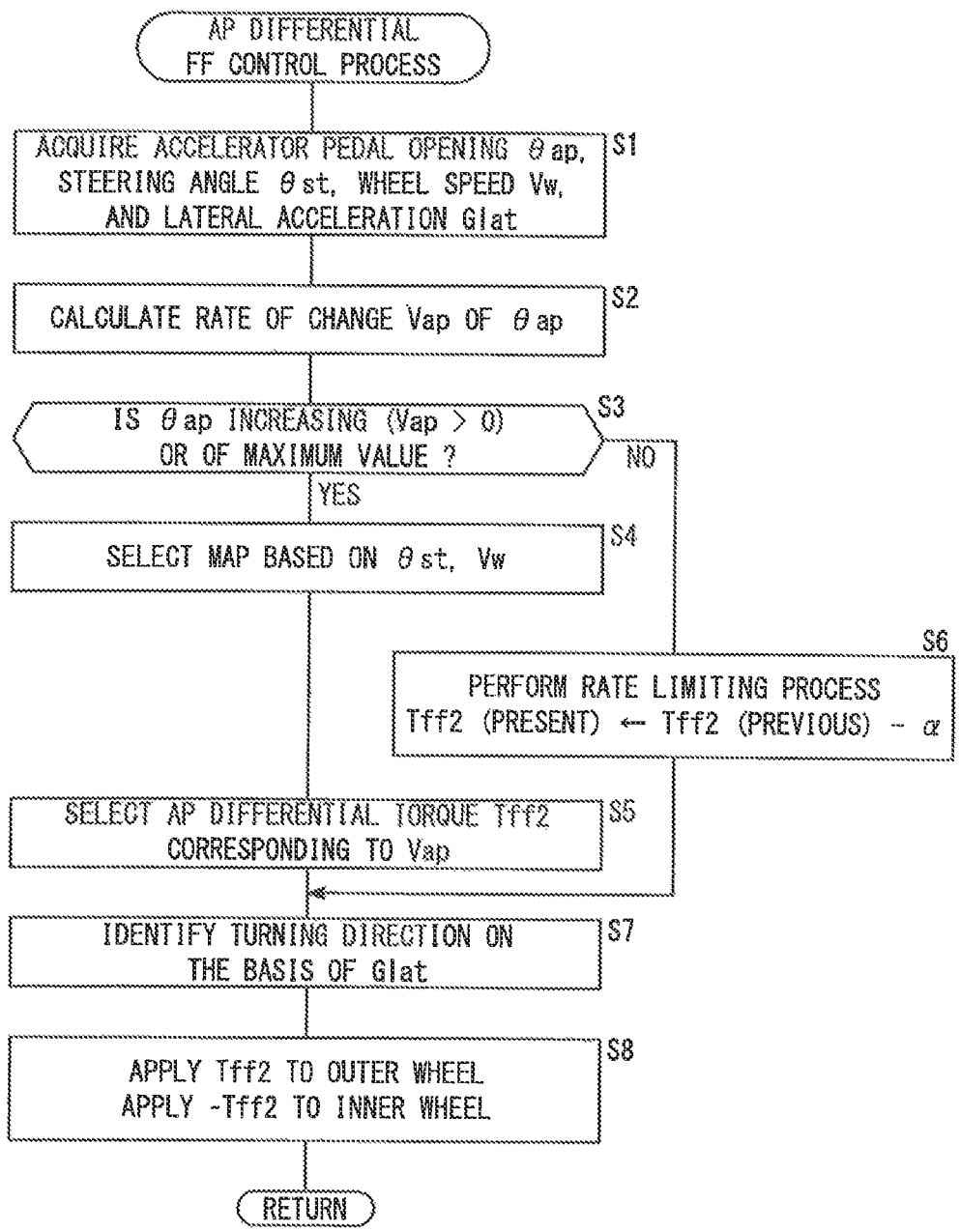
FIG. 4 is a flowchart of an accelerator-pedal differential feed-forward control process (AP differential FF control process)

FIG. 4 is a flowchart of the AP differential FF control process. FIG. 5 is a diagram showing, by way of example, various data that are produced when the AP differential FF control process shown in FIG. 4 is carried out. In FIG. 5, the broken-line curves represent data at a predetermined vehicle speed V and a predetermined steering angle θst. Further, in FIG. 5, the solid-line curves represent data at the same vehicle speed V as the broken-line curves, and at a steering angle θst that is greater than the broken-line curves. FIG. 5 also shows data produced when the driver has strongly depressed the accelerator pedal 64, at time t1 while the vehicle 10 is cruising.

In step S1 of FIG. 4, the AP differential FF controller 72 acquires the AP opening θap from the AP opening sensor 58, acquires the steering angle θst from the steering angle sensor 52, acquires the wheel speed Vw from the wheel speed sensor 56, and acquires the lateral acceleration Glat from the lateral G sensor 54.

In step S2, the FF controller 72 calculates a rate of change Vap, which is a time differential of the AP opening θap. In step S3, the FF controller 72 determines if the AP opening θap is increasing or is of a maximum value. The FF controller 72 determines whether or not the AP opening θap is increasing by checking if the rate of change Vap is of a positive value. The maximum value of the AP opening θap signifies a value beyond which the driver is incapable of further depressing the accelerator pedal 64.

If the AP opening θap is increasing or is of a maximum value (step S3: YES), then in step S4, the FF controller 72 selects a map based on the combination of the steering angle θst and the wheel speed Vw. The map specifies a relationship between the rate of change Vap and the AP differential torque Tff2. According to the present embodiment, the driving ECU 28 stores in a non-illustrated memory a plurality of maps for respective combinations of the steering angle θst and the wheel speed Vw. The wheel speed Vw is concerned with left and right wheels (in this case, the rear wheels 36a, 36b) the driving force distribution ratio of which is variable. The wheel speed Vw may be an average value of the wheel speeds Vwrl, Vwrr, for example. Alternatively, the wheel speed Vw may be a greater or smaller value of the wheel speeds Vwrl, Vwrr. Further, alternatively, as will be described later, other processes apart from using the maps may be employed.

Each of the maps specifies a relationship between the rate of change Vap and the AP differential torque Tff2, wherein assuming that the rate of change Vap of the AP opening θap is constant, the AP differential torque Tff2 is smaller if the wheel speed Vw of the left and right rear wheels 36a, 36b is high rather than if the wheel speed Vw is low. Each of the maps also specifies a relationship between the rate of change Vap and the AP differential torque Tff2, wherein assuming that the rate of change Vap of the AP opening θap is constant, the AP differential torque Tff2 is smaller if the steering angle θst is small rather than if the steering angle θst is large.

In step S5, in the map that was selected in step S4, the FF controller 72 selects an AP differential torque Tff2, which corresponds to the rate of change Vap that was calculated in step S2.

Referring back to step S3, if the AP opening θap is not increasing and is not of a maximum value (step S3: NO), it is considered that the driver wishes for the vehicle 10 to continue cruising or to be decelerated. In this case, in step S6, the FF controller 72 performs a rate limiting process for reducing the AP differential torque Tff2. If the AP opening θap has remained continuously at a maximum value for a predetermined time, the FF controller 72 proceeds to step S6, even though the AP opening θap is of a maximum value.

More specifically, the FF controller 72 uses a value that is produced by subtracting a certain positive value α from a preceding value of the AP differential torque Tff2 (hereinafter referred to as an "AP differential torque Tff2 (preceding)"), as a present value of the AP differential torque Tff2 (hereinafter referred to as an "AP differential torque Tff2 (present)") (Tff2 (present)←Tff2 (preceding)−α). Since the lowest value of the torque Tff2 is zero, the torque Tff2 does not assume a negative value.

The value α according to the present embodiment is established in order to make constant the times until the AP opening θap becomes zero, for any values of the steering angle θst and the vehicle speed Vw at times that the AP opening θap is decreased from the maximum value thereof.

For example, as shown in FIG. 5, at time t1 and in the vicinity thereof, the wheel speed Vw is constant and the steering angle θst is different. Therefore, in FIG. 5, the maximum value of the AP differential torque Tff2 becomes greater as the steering angle θst is greater. If the value α is constant, the amount of time consumed until the AP differential torque Tff2 decreases to zero from the maximum value thereof becomes longer if the steering angle θst is greater.

According to the present embodiment, however, the value α is established in order to make constant the times until the AP opening θap becomes zero, for any values of the steering angle θst and the vehicle speed Vw at times that the AP opening θap is decreased from the maximum value thereof. Consequently, the value α becomes greater as the steering angle θst is greater.

After step S5 or step S6, in step S7, the FF controller 72 identifies a turning direction for the vehicle 10 on the basis of the lateral acceleration Glat that was acquired in step S1.

Subsequently, in step S8, the FF controller 72 applies the AP differential torque Tff2 to an outer one of the left and right rear wheels 36a, 36b, and also applies the value −Tff2, which is a negative value of the AP differential torque Tff2, to an inner one of the left and right rear wheels 36a, 36b. More specifically, with respect to the outer wheel, the FF controller 72 outputs the AP differential torque Tff2 to the first adder 74 or the second adder 76, and with respect to the inner wheel, outputs the value −Tff2, which is a negative value of the AP differential torque Tff2, to the first adder 74 or the second adder 76.

As described above, the second motor 16 and the third motor 18 can be rotated in the normal direction, as well as in the reverse direction. In view of this feature, according to the present embodiment, the value −Tff2, which is applied to the inner one of the left and right rear wheels 36a, 36b, allows the torque of the inner wheel to be of a negative value. For example, if the rate of change Vap of the AP opening bap exceeds a threshold value at a predetermined wheel speed Vw and a predetermined steering angle θst, the FF controller 72 establishes the value −Tff2, such that the torque of the inner one of the left and right rear wheels 36a, 36b becomes a negative value. Consequently, if the vehicle 10 is making a turn, the inner wheel outputs a negative torque in order to assist the vehicle 10 in making the turn. At this time, the motor corresponding to the inner wheel (one of the motors 16, 18) regenerates electric power.

Figure 6:
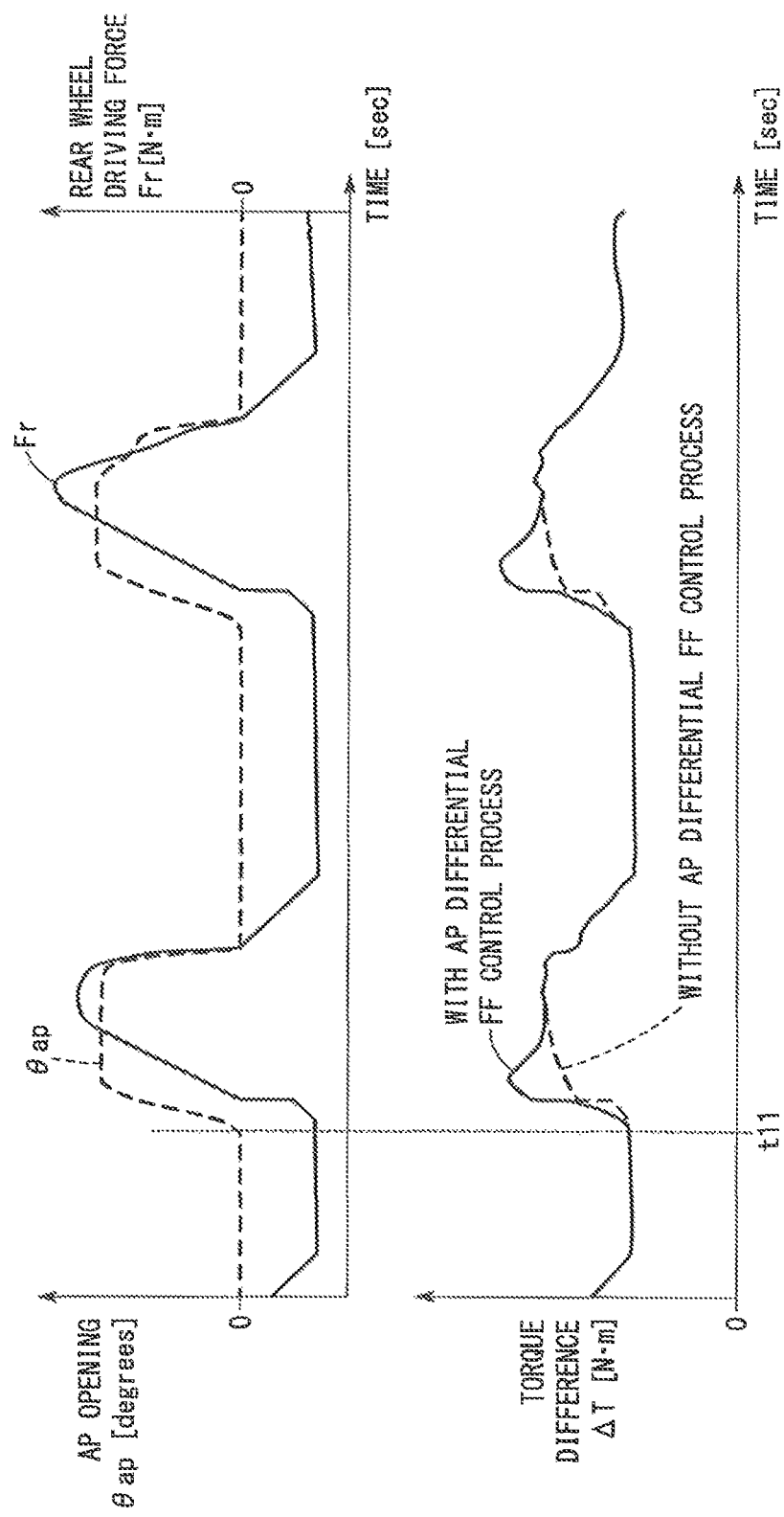
FIG. 6 is a diagram showing, by way of example, outputs that occur when the AP differential FF control process is carried out, as well as when the AP differential FF control process is not carried out.

B-2. Comparison Between Use of AP Differential FF Control Process and Non-Use of AP Differential FF Control Process FIG. 6 is a diagram showing, by way of example, outputs when the AP differential FF control process is carried out as well as when the AP differential FF control process is not carried out. FIG. 6 shows the torque difference ΔT according to the present embodiment (in the case that both the steering-angle proportional FF control process and the AP differential FF control process are carried out) together with a torque difference ΔT according to a comparative example. According to the comparative example, the steering-angle proportional FF control process is carried out, but the AP differential FF control process is not carried out.

As shown in FIG. 6, when the AP opening θap starts increasing at time t11, the torque difference ΔT according to the present embodiment immediately changes more so than the torque difference ΔT according to the comparative example. Therefore, even at a time that the change in the lateral acceleration Glat is small, the torque difference ΔT between the left and right rear wheels 36a, 36b can be increased immediately if the rate of change Vap of the AP opening θap is large. Accordingly, it is possible to enhance responsiveness to an action carried out on the accelerator pedal 64 while the vehicle 10 is making a turn.

C. Advantages of the Present Embodiment

According to the present embodiment, as described above, the torque difference ΔT (power difference) between the left and right rear wheels 36a, 36b (left and right drive wheels) is adjusted on the basis of the steering angle θst (requested amount of turn) and the rate of change Vap of the AP opening θap (requested amount of drive power) (FIGS. 2 and 4). Therefore, even if the steering angle θst remains the same, the torque difference ΔT between the left and right rear wheels 36a, 36b varies depending on the rate of change Vap. Consequently, if the torque difference ΔT between the left and right rear wheels 36a, 36b increases as the rate of change Vap becomes higher, it is easier for the vehicle 10 (vehicle body) to turn in a stable manner. In particular, such a feature is manifested in a low speed range in which the responsiveness of the behavior of the vehicle 10 to a steering action is low. Consequently, the above control process makes it possible to stabilize the attitude of the vehicle 10, or to increase the responsiveness of the behavior of the vehicle 10 to the intentions (high-speed turning) of the driver.

According to the present embodiment, the vehicle 10 includes the rear first motor 16 (first prime mover), which is connected to the left rear wheel 36a (left drive wheel), and the rear second motor 18 (second prime mover), which is connected to the right rear wheel 36b (right drive wheel) (see FIG. 1). The driving ECU 28 (turn control apparatus) controls the torques of the motors 16, 18 in order to adjust the torque difference ΔT between the left and right rear wheels 36a, 36b on the basis of the rate of change Vap of the AP opening θap (steps S5, S7, and S8 in FIG. 4).

With such an arrangement, the torques of the motors 16, 18 are controlled to thereby adjust the torque difference ΔT between the left and right rear wheels 36a, 36b (left and right drive wheels). Since the motors (prime movers) are connected respectively to the left and right rear wheels 36a, 36b, it is possible to individually control the outputs of the left and right rear wheels 36a, 36b.

According to the present embodiment, the rear first motor 16 (first prime mover) and the rear second motor 18 (second prime mover) are electric motors, which are capable of generating torques in forward and reverse directions of the vehicle 10. When necessary, the driving ECU 28 (turn control apparatus) causes one of the motors 16, 18, which corresponds to an outer wheel while the vehicle 10 is making a turn, to generate a forward torque (positive value), and also causes one of the motors 16, 18, which corresponds to an inner wheel while the vehicle 10 is making the turn, to generate a reverse torque (negative value), thereby adjusting the torque difference ΔT (steps S5, S7, and S8 in FIG. 4).

With the above arrangement, the torque difference ΔT between the left and right rear wheels 36a, 36b is adjusted by the driving ECU 28 through the motors 16, 18, which are connected respectively to the left and right rear wheels 36a, 36b. Generally, several motors (electric motors) are capable of controlling the torques thereof with high responsiveness and high resolution. Consequently, the above arrangement makes it possible to generate the torque difference ΔT between the left and right rear wheels 36a, 36b with high responsiveness and high resolution.

One of the motors 16, 18, which corresponds to an outer wheel, is caused to generate a torque in the forward direction of the vehicle 10. In addition, one of the motors 16, 18, which corresponds to an inner wheel, is caused to generate a torque in the reverse direction of the vehicle 10 (step S8 in FIG. 4). Accordingly, the torque difference ΔT between the left rear wheel 36a (left drive wheel) and the right rear wheel 36b (right drive wheel) can be adjusted. Thus, it is possible to establish the torque difference ΔT flexibly, without being subjected to a limitation in which the torques of both the left and right rear wheels 36a, 36b must be in the forward direction (of positive values). Consequently, it is possible to further enhance the attitude control or operational performance of the vehicle 10 depending on the situation in which the vehicle 10 is in.

According to the present embodiment, assuming that the rate of change Vap of the AP opening θap (time differential of a requested amount of drive power) is constant, the driving ECU 28 (turn control apparatus) makes the torque difference ΔT smaller when the rotational speeds (wheel speeds Vw) of the left rear wheel 36a (left drive wheel) and the right rear wheel 36b (right drive wheel) are high rather than when the rotational speeds are low (steps S4, S5 in FIG. 4).

With the above arrangement, if the vehicle speed V is high, the torque difference ΔT between the left and right rear wheels 36a, 36b is reduced based on the rate of change Vap of the AP opening θap. Therefore, it is possible to prevent the behavior of the vehicle 10 from becoming unstable due to the torque difference ΔT between the left and right rear wheels 36a, 36b being generated excessively when the vehicle speed V is high.

According to the above embodiment, assuming that the rate of change Vap of the AP opening θap (time differential of a requested amount of drive power) is constant, the driving ECU 28 (turn control apparatus) makes the torque difference ΔT smaller when the steering angle θst (requested amount of turn) is small rather than when the steering angle θst is large (steps S4, S5 in FIG. 4, see also the AP differential torque Tff2 in FIG. 5).

With the above arrangement, if the steering angle θst is small, the torque difference ΔT between the left and right rear wheels 36a, 36b is reduced based on the rate of change Vap of the AP opening θap. Therefore, if the steering wheel 62 is turned out of control by a rolling surface or a rut in the road, or if the driver turns the steering wheel through a small angle, it is possible to prevent the behavior of the vehicle 10 from being disturbed due to excessive generation of the torque difference ΔT between the left and right rear wheels 36a, 36b.

According to the above embodiment, the driving ECU 28 (turn control apparatus) calculates an AP differential torque Tff2 (additive torque), which is added to an outer one of the left rear wheel 36a (left drive wheel) and the right rear wheel 36b (right drive wheel) while the vehicle 10 is making a turn, and a value −Tff2 (subtractive torque), which is a negative value of the AP differential torque Tff2 that is subtracted from an inner one of the left rear wheel 36a and the right rear wheel 36b on the basis of the rate of change Vap of the AP opening θap (steps S5, S7, and S8 in FIG. 4). In addition, the absolute value of the additive torque Tff2 and the absolute value of the subtractive torque −Tff2 are equal to each other. Thus, it is possible to adjust the torque difference ΔT between the left and right rear wheels 36a, 36b without changing the total value (rear wheel driving forces Fr) of the torques that are generated by the rear first motor 16 and the rear second motor 18, thereby preventing the driver from feeling uneasy and uncomfortable as a result of a change in the torques or the rear wheel driving forces Fr upon adjustment of the torque difference ΔT.

II. Modifications

The present invention is not limited to the embodiment described above, but various arrangements may be employed based on the content of the disclosure of the present specification. For example, the present invention may employ the following arrangements.

A. Vehicle 10 (Object to which the Present Invention is Applicable)

In the above embodiment, a vehicle 10 in the form of a four-wheeled motor vehicle has been described (FIG. 1). The present invention is not limited to such a four-wheeled motor vehicle, insofar as the torque difference ΔT (power difference) between the left rear wheel 36a (left drive wheel) and the right rear wheel 36b (right drive wheel) can be adjusted on the basis of the rate of change Vap of the AP opening bap in addition to the steering angle θst. For example, the present invention may be applied to a three-wheeled motor vehicle or a six-wheeled motor vehicle.

According to the above embodiment, the vehicle 10 uses the single engine 12 and the three traction motors 14, 16, 18 as drive sources (prime movers) (FIG. 1). However, the drive sources are not limited to such a combination. For example, the vehicle 10 may have one or more traction motors for the front wheels 32 and one or more traction motors for the rear wheels 36, which serve as drive sources. Alternatively, the vehicle 10 may have a single traction motor for the front wheels 32 or the rear wheels 36, with the driving forces being distributed to the left and right wheels by a differential device. The vehicle 10 may also have an arrangement in which individual traction motors (including so-called in-wheel motors) are assigned respectively to all of the wheels.

According to the above embodiment, the front wheel driving apparatus 34 including the engine 12 and the first motor 14 drives the front wheels 32, whereas the rear wheel driving apparatus 38 including the second and third motors 16, 18 drives the rear wheels 36. However, the present invention is not limited to such an arrangement, insofar as the torque difference ΔT (power difference) between the left rear wheel 36a (left drive wheel) and the right rear wheel 36b (right drive wheel) can be adjusted on the basis of the rate of change Vap of the AP opening bap in addition to the steering angle θst. For example, according to the above embodiment, the torque difference ΔT (power difference) that is adjusted occurs between the left and right rear wheels 36a, 36b. However, depending on the structure of the vehicle 10, it also is possible to adjust the torque difference ΔT between the left and right front wheels 32a, 32b.

A-1. First Modification

Figure 7:
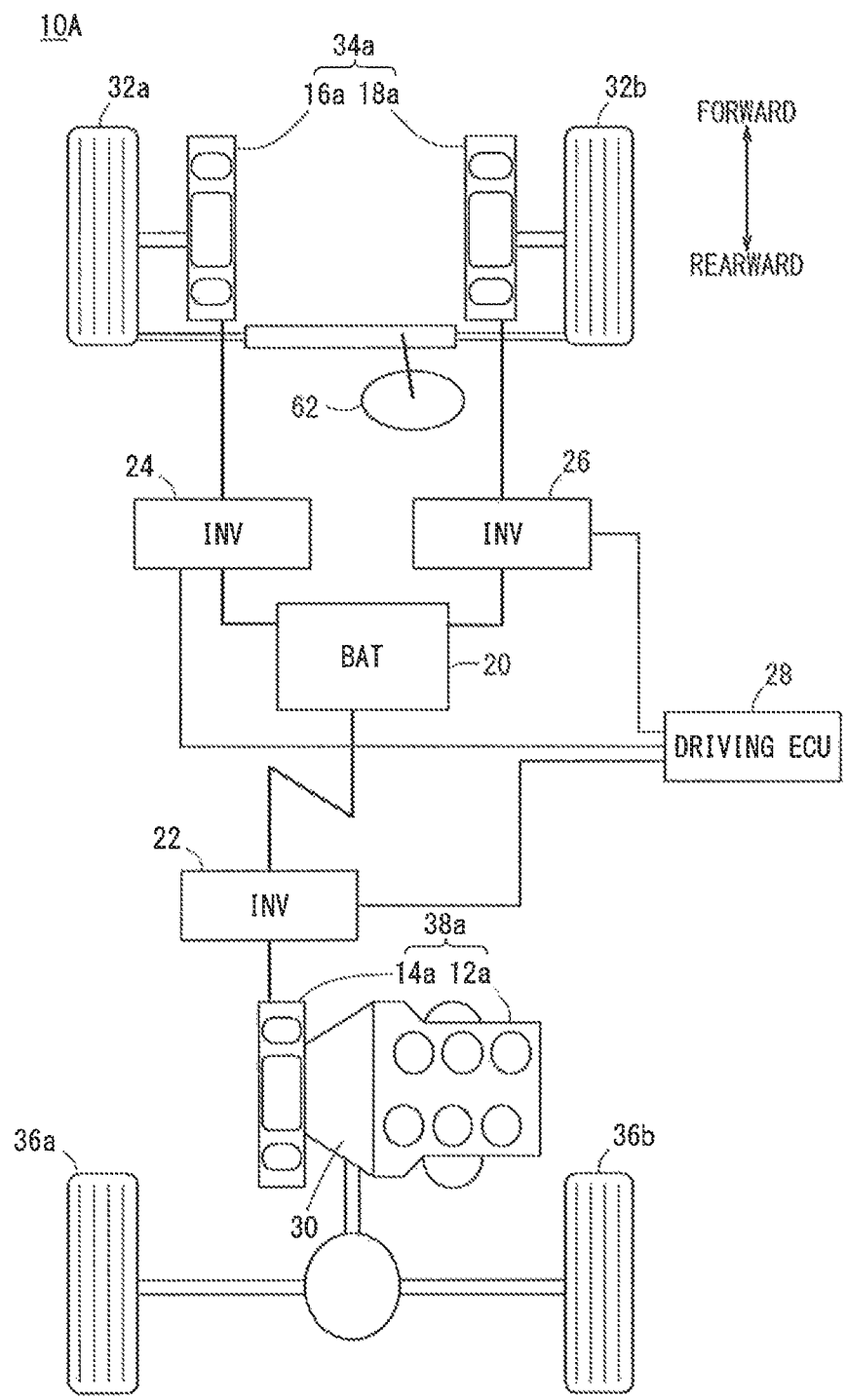
FIG. 7 is a schematic diagram showing a drive system and peripheral components of a vehicle according to a first modification of the present invention.

FIG. 7 is a schematic diagram showing a drive system and peripheral components of a vehicle 10A according to a first modification of the present invention. The vehicle 10A includes a front wheel driving apparatus 34a and a rear wheel driving apparatus 38a, which are a structural reversal of the front wheel driving apparatus 34 and the rear wheel driving apparatus 38 of the vehicle 10 according to the above embodiment. More specifically, the front wheel driving apparatus 34a of the vehicle 10A includes second and third traction motors 16a, 18a, which are disposed in a front region of the vehicle 10A. Further, the rear wheel driving apparatus 38a of the vehicle 10A includes an engine 12a and a first traction motor 14a, which are disposed in series in a rear region of the vehicle 10A.

A-2. Second Modification

Figure 8:
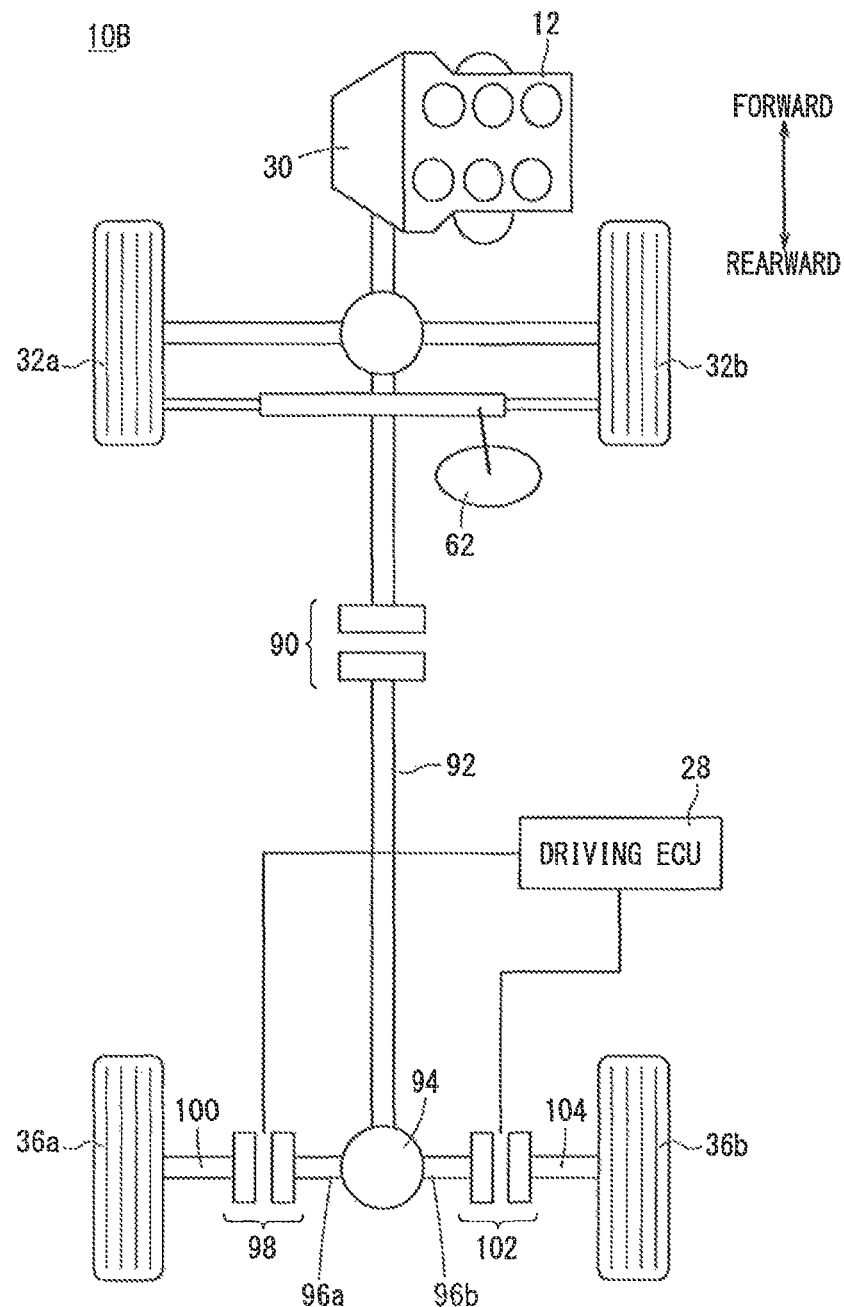
FIG. 8 is a schematic diagram showing a drive system and peripheral components of a vehicle according to a second modification of the present invention.

FIG. 8 is a schematic diagram showing a drive system and peripheral components of a vehicle 10B according to a second modification of the present invention. In the vehicle 10B, a driving force from the engine 12 (hereinafter referred to as a "driving force Feng") is transmitted to the front wheels 32a, 32b and the rear wheels 36a, 36b, such that in addition to the front wheels 32a, 32b (main drive wheels), the rear wheels 36a, 36b (auxiliary drive wheels) are used as drive wheels. As with the above embodiment (FIG. 1), the motor 14 may be connected to the engine 12.

The vehicle 10B includes a transfer clutch 90, a propeller shaft 92, a differential gear 94, differential gear output shafts 96a, 96b (hereinafter also referred to as "output shafts 96a, 96b"), a first clutch 98, a left output shaft 100, a second clutch 102, and a right output shaft 104.

The transfer clutch 90 adjusts the driving force Feng from the engine 12, which is distributed to the rear wheels 36a, 36b through the propeller shaft 92. The differential gear 94 distributes the driving force Feng, which is transmitted for the rear wheels 36a, 36b through the propeller shaft 92, as equal driving forces to the left and right output shafts 96a, 96b.

The first clutch 98 adjusts the degree of engagement thereof based on a command from the driving ECU 28, and transmits the driving force from the output shaft 96a to the left output shaft 100, which is fixedly coupled to the left rear wheel 36a. The second clutch 102 adjusts the degree of engagement thereof based on a command from the driving ECU 28, and transmits a driving force from the output shaft 96b to the right output shaft 104, which is fixedly coupled to the right rear wheel 36b.

With the above arrangement, the vehicle 10B is capable of individually adjusting the driving forces (torques) of the rear wheels 36a, 36b. Additional structural details of the vehicle 10B may be found in US 2005/0217921 A1, for example.

With the vehicle 10B according to the second modification, the engine 12 (prime mover) and the left rear wheel 36a (left rear wheel) are connected to each other through the first clutch 98 (first power transmitting mechanism), whereas the engine 12 (prime mover) and the right rear wheel 36b (right rear wheel) are connected to each other through the second clutch 102 (second power transmitting mechanism). The first clutch 98 and the second clutch 102 are not only capable of switching between an engaged state and a disengaged state, but also can adjust the degree of slippage of the first clutch 98 and the second clutch 102 upon switching between a plurality of stages of the engaged state or the disengaged state. On the basis of the rate of change Vap of the AP opening θap, the driving ECU 28 (controller) controls the first clutch 98 and the second clutch 102 in order to adjust the torque difference ΔT between the left rear wheel 36a and the right rear wheel 36b. Therefore, it is possible to adjust the torque difference ΔT between the left and right rear wheels 36a, 36b without being required to wait for a change in the output of the engine 12 based on the AP opening θap.

The first clutch 98 is capable of being switched between an engaged state for transmitting power between the engine 12 and the left rear wheel 36a, and a disengaged state for cutting off transmission of power between the engine 12 and the left rear wheel 36a. Similarly, the second clutch 102 is capable of being switched between an engaged state for transmitting power between the engine 12 and the right rear wheel 36b, and a disengaged state for cutting off transmission of power between the engine 12 and the right rear wheel 36b. Furthermore, on the basis of the rate of change Vap of the AP opening θap, the driving ECU 28 switches between the engaged state and the disengaged state of the first clutch 98 and the second clutch 102 in order to adjust the torque difference ΔT between the left rear wheel 36a and the right rear wheel 36b.

With the above arrangement, the driving ECU 28 adjusts the torque difference ΔT between the left and right rear wheels 36a, 36b by engaging and disengaging the first clutch 98 and the second clutch 102. In this manner, it is possible to adjust the torque difference ΔT between the left and right rear wheels 36a, 36b by engaging and disengaging the first clutch 98 and the second clutch 102. Therefore, it is possible to generate the torque difference ΔT with high responsiveness.

A-3. Third Modification

FIG. 9 is a schematic diagram showing a drive system and peripheral components of a vehicle 10C according to a third modification of the present invention. Similar to the vehicle 10B according to the second modification, the vehicle 10C is arranged such that a driving force from the engine 12 (driving force Feng) is transmitted to the front wheels 32a, 32b and the rear wheels 36a, 36b, in such a manner that the rear wheels 36a, 36b (auxiliary drive wheels) in addition to the front wheels 32a, 32b (main drive wheels) are used as drive wheels. Reference characters, which are the same as those for the vehicle 10B, are used, and detailed description of such features is omitted. Further, similar to the above embodiment (FIG. 1), the motor 14 may be connected to the engine 12.

In addition to a transfer clutch 90, a propeller shaft 92, a differential gear 94, differential gear output shafts 96a, 96b (output shafts 96a, 96b), a left output shaft 100, and a right output shaft 104, the vehicle 10C also includes a first redistribution mechanism 110 and a second redistribution mechanism 112.

When the vehicle 10C makes a left turn, the first redistribution mechanism 110 transmits part or all of the driving force, which is distributed or branched from the differential gear 94 to the left rear wheel 36a, to the right rear wheel 36b. The first redistribution mechanism 110 includes a left-turn clutch, a sun gear for the left rear wheel 36a, a set of three meshing pinion gears, and a sun gear for the right rear wheel 36b, none of which are shown.

When the vehicle 10C makes a right turn, the second redistribution mechanism 112 transmits part or all of the driving force, which is distributed or branched from the differential gear 94 to the right rear wheel 36b, to the left rear wheel 36a. The second redistribution mechanism 112 includes a right-turn clutch, a sun gear for the right rear wheel 36b, a set of three meshing pinion gears, and a sun gear for the left rear wheel 36a, none of which are shown.

The left-turn clutch of the first redistribution mechanism 110 and the right-turn clutch of the second redistribution mechanism 112 are not only capable of switching between an engaged state and a disengaged state, but also can adjust the degree of slippage thereof upon switching between a plurality of stages of the engaged state or the disengaged state.

With the above arrangement, the vehicle 10C is capable of individually adjusting the driving forces of the rear wheels 36a, 36b. Additional structural details of the vehicle 10C may be found in Japanese Laid-Open Patent Publication No. 2011-131618, for example.

As with the vehicle 10B according to the second modification, the vehicle 10C according to the third modification is capable of adjusting the torque difference ΔT between the left and right rear wheels 36a, 36b, without being required to wait for a change in the output of the engine 12 based on the AP opening θap. In addition, the vehicle 10C is capable of adjusting the torque difference ΔT with high responsiveness.

B. First Through Third Traction Motors 14, 16, 18

According to the above embodiment, each of the first through third traction motors 14, 16, 18 comprises a three-phase AC brushless motor. However, the first through third traction motors 14, 16, 18 are not limited to such motors, but may comprise any of a three-phase AC brush motor, a single-phase AC motor, or a DC motor.

According to the above embodiment, the first through third traction motors 14, 16, 18 are supplied with electric power from the high-voltage battery 20. However, the first through third traction motors 14, 16, 18 may be supplied additionally with electric power from a fuel battery.

C. Torque Control

C-1. Overview

According to the above embodiment, the steering-angle proportional FF control process, the AP differential FF control process, and the FB control process are carried out respectively (see FIG. 2). However, by focusing on the AP differential FF control process, for example, it is possible to dispense with one or both of the steering-angle proportional FF control process and the FB control process.

According to the above embodiment, the torques of the front wheel driving apparatus 34 and the rear wheel driving apparatus 38 are controlled on the basis of the driver's action carried out with respect to the accelerator pedal 64. However, the present invention is not limited to such control details, insofar as the torques of the front wheel driving apparatus 34 and the rear wheel driving apparatus 38 can be controlled. For example, the present invention may also be applied to a situation in which the vehicle 10 automatically controls the torques of the front wheel driving apparatus 34 and the rear wheel driving apparatus 38 (so-called automatic driving). Automatic driving may be directed not only to the torques of the front wheel driving apparatus 34 and the rear wheel driving apparatus 38, but also to steering of the vehicle.

According to the above embodiment, the driving ECU 28 controls the torques of the front wheel driving apparatus 34 and the rear wheel driving apparatus 38 as objects to be processed. However, the present invention is not limited to such control details, insofar as the torques (amounts of drive power) of the front wheel driving apparatus 34 and the rear wheel driving apparatus 38 can be controlled. For example, rather than torques, the driving ECU 28 may control outputs or driving forces, which can be converted to or from such torques, as objects to be processed.

C-2. AP Differential FF Control Process

According to the above embodiment, a map based on the steering angle θst and the wheel speed Vw is used for calculating (selecting) an AP differential torque Tff2 (steps S4, S5 in FIG. 4). However, the present invention is not limited to such control details, insofar as the AP differential torque Tff2 is used. For example, a single map, which specifies the relationship between the rate of change Vap of the AP opening θap and the torque Tff2, may be provided, and based thereon, a torque Tff2 may be selected or calculated using the single map.

According to the above embodiment, the torque Tff2 is added to an outer one of the left and right rear wheels 36a, 36b, and the torque Tff2 is subtracted from, or stated otherwise, a negative torque −Tff2 is added to, an inner one of the left and right rear wheels 36a, 36b. However, the present invention is not limited to such control details, insofar as the torque difference ΔT (power difference) between the left rear wheel 36a (left drive wheel) and the right rear wheel 36b (right drive wheel) can be adjusted on the basis of the rate of change Vap of the AP opening θap in addition to the steering angle θst. For example, the present invention may have an arrangement in which the torque Tff2 only is added to the outer wheel, or an arrangement in which the torque Tff2 only is subtracted from the inner wheel.

According to the above embodiment, if the rate of change Vap of the AP opening θap is high, the torque difference ΔT is increased (step S5 in FIG. 4). However, conversely, if the rate of change Vap of the AP opening θap is high, the torque difference ΔT may be reduced in order to easily prevent the vehicle 10 from slipping if the vehicle 10 starts to be driven on a snowy road, for example.

C-3. Other Features

According to the above embodiment, in the AP differential FF control process (in step S5 of FIG. 4), the torque difference ΔT between the left and right rear wheels 36a, 36b is varied depending on the rate of change Vap of the AP opening θap. However, the present invention is not limited to such control details, insofar as the torques of the left and right rear wheels 36a, 36b can be varied depending on the rate of change Vap of the AP opening θap. For example, in addition to or instead of adjusting the torque difference ΔT, the FF total torque Tff_total (e.g., the torque Tff2) may be increased or reduced depending on the rate of change Vap. For example, if the rate of change Vap is increased, the FF total torque Tff_total can be increased. Such a control process makes it possible to stabilize the attitude of the vehicle 10, or to increase responsiveness of the behavior of the vehicle 10 to the intentions (high-speed turning) of the driver.

The invention claimed is:

1. A vehicle comprising:
    a left drive wheel and a right drive wheel that are connected to a prime mover;
    a requested-amount-of-drive-power input device configured to input a requested amount of drive power;
    a requested-amount-of-turn input device configured to input a requested amount of turn; and
    a turn control apparatus configured to adjust a power difference between the left drive wheel and the right drive wheel by using the requested amount of turn input by the requested-amount-of-turn input device, the turn control apparatus being configured to obtain a time differential of the requested amount of drive power input by the requested-amount-of-drive-power input device and adjust the power difference between the left drive wheel and the right drive wheel by using the obtained time differential of the requested amount of drive power,
    wherein:
    the prime mover includes a first prime mover connected to the left drive wheel, and a second prime mover connected to the right drive wheel, the turn control apparatus controls power of the first prime mover and the second prime mover in order to adjust the power difference by using the time differential of the requested amount of drive power, the first prime mover and the second prime mover comprise electric motors, respectively, configured to generate power in a forward direction and generating power in a reverse direction of the vehicle, and the turn control apparatus controls one of the first prime mover and the second prime mover, which corresponds to an outer one of the wheels while the vehicle is making a turn, in order to generate the power in the forward direction, and further controls one of the first prime mover and the second prime mover, which corresponds to an inner one of the wheels while the vehicle is making the turn, in order to generate the power in the reverse direction to adjust the power difference.

2. The vehicle according to claim 1, wherein the turn control apparatus increases the power difference as the time differential of the requested amount of drive power becomes greater.

3. The vehicle according to claim 1, wherein, assuming that the time differential of the requested amount of drive power is constant, the turn control apparatus makes the power difference smaller when the rotational speed of the left drive wheel is high rather than when the rotational speed of the left drive wheel is low, or when the rotational speed of the right drive wheel is high rather than when the rotational speed of the right drive wheel is low.

4. The vehicle according to claim 1, wherein, assuming that the time differential of the requested amount of drive power is constant, the turn control apparatus makes the power difference smaller when the requested amount of turn is small rather than when the requested amount of turn is large.

5. The vehicle according to claim 1, wherein:

the turn control apparatus calculates an additive power, which is added to power of an outer one of the left drive wheel and the right drive wheel while the vehicle is making a turn, and a subtractive power, which is subtracted from power of an inner one of the left drive wheel and the right drive wheel while the vehicle is making the turn, on a basis of the time differential of the requested amount of drive power; and the turn control apparatus makes an absolute value of the additive power and the absolute value of the subtractive power equal to each other.

6. The vehicle according to claim 1, wherein:

the first prime mover and the second prime mover comprise electric motors, respectively, configured to generate power in a forward direction and generating power in a reverse direction of the vehicle; and the vehicle further comprises an electric energy storage device, which is connected electrically to the electric motors.

7. A vehicle comprising:

a left drive wheel and a right drive wheel that are connected to a prime mover;

a requested-amount-of-drive-power input device configured to input a requested amount of drive power;

a requested-amount-of-turn input device configured to input a requested amount of turn; and a turn control apparatus configured to adjust a power difference between the left drive wheel and the right drive wheel by using the requested amount of turn input by the requested-amount-of-turn input device, the turn control apparatus being configured to obtain a time differential of the requested amount of drive power input by the requested-amount-of-drive-power input device and adjust the power difference between the left drive wheel and the right drive wheel by using the obtained time differential of the requested amount of drive power, wherein:

the prime mover and the left drive wheel are connected to each other through a first power transmitting mechanism, the prime mover and the right drive wheel are connected to each other through a second power transmitting mechanism, the turn control apparatus controls the first power transmitting mechanism and the second power transmitting mechanism in order to adjust the power difference by using the time differential of the requested amount of drive power, the first power transmitting mechanism includes a first engaging and disengaging unit configured to switch between an engaged state, for transmitting power between the prime mover and the left drive wheel, and a disengaged state, for cutting off transmission of power between the prime mover and the left drive wheel;

the second power transmitting mechanism includes a second engaging and disengaging unit configured to switch between an engaged state, for transmitting power between the prime mover and the right drive wheel, and a disengaged state, for cutting off transmission of power between the prime mover and the right drive wheel; and the turn control apparatus controls the first engaging and disengaging unit and the second engaging and disengaging unit in order to switch between the engaged state and the disengaged state, to adjust the power difference by using the time differential of the requested amount of drive power.

8. The vehicle according to claim 7, wherein the turn control apparatus increases the power difference as the time differential of the requested amount of drive power becomes greater.

9. The vehicle according to claim 7, wherein, assuming that the time differential of the requested amount of drive power is constant, the turn control apparatus makes the power difference smaller when the rotational speed of the left drive wheel is high rather than when the rotational speed of the left drive wheel is low, or when the rotational speed of the right drive wheel is high rather than when the rotational speed of the right drive wheel is low.

10. The vehicle according to claim 7, wherein, assuming that the time differential of the requested amount of drive power is constant, the turn control apparatus makes the power difference smaller when the requested amount of turn is small rather than when the requested amount of turn is large.

11. The vehicle according to claim 7, wherein:

the turn control apparatus calculates an additive power, which is added to power of an outer one of the left drive wheel and the right drive wheel while the vehicle is making a turn, and a subtractive power, which is subtracted from power of an inner one of the left drive wheel and the right drive wheel while the vehicle is making the turn, on a basis of the time differential of the requested amount of drive power; and the turn control apparatus makes an absolute value of the additive power and the absolute value of the subtractive power equal to each other.

12. A vehicle comprising:
a left drive wheel and a right drive wheel that are connected to a prime mover;
a requested-amount-of-drive-power input device configured to input a requested amount of drive power;
a requested-amount-of-turn input device configured to input a requested amount of turn; and
a turn control apparatus configured to adjust a power difference between the left drive wheel and the right drive wheel by using the requested amount of turn input by the requested-amount-of-turn input device, the turn control apparatus being configured to obtain a time differential of the requested amount of drive power input by the requested-amount-of-drive-power input device and adjust the power difference between the left drive wheel and the right drive wheel by using the obtained time differential of the requested amount of drive power,
wherein:
the prime mover and the left drive wheel are connected to each other through a first power transmitting mechanism,
the prime mover and the right drive wheel are connected to each other through a second power transmitting mechanism,
the turn control apparatus controls the first power transmitting mechanism and the second power transmitting mechanism in order to adjust the power difference by using the time differential of the requested amount of drive power,
a differential mechanism configured to distribute power from the prime mover to the left drive wheel and the right drive wheel;
wherein the first power transmitting mechanism is disposed between the left drive wheel and the differential mechanism; and
the second power transmitting mechanism is disposed between the right drive wheel and the differential mechanism.

13. A vehicle comprising:
a left drive wheel and a right drive wheel that are connected to a prime mover;
a requested-amount-of-drive-power input device configured to input a requested amount of drive power;
a requested-amount-of-turn input device configured to input a requested amount of turn;
a turn control apparatus configured to adjust a power difference between the left drive wheel and the right drive wheel by using the requested amount of turn input by the requested-amount-of-turn input device, the turn control apparatus being configured to obtain a time differential of the requested amount of drive power input by the requested-amount-of-drive-power input device and adjust the power difference between the left drive wheel and the right drive wheel by using the obtained time differential of the requested amount of drive power;
a differential mechanism configured to distribute power from the prime mover to the left drive wheel and the right drive wheel;
a first redistribution mechanism configured to transmit part or all of the power distributed to the left drive wheel by the differential mechanism to the right drive wheel; and
a second redistribution mechanism configured to transmit part or all of the power distributed to the right drive wheel by the differential mechanism to the left drive wheel;
wherein the turn control apparatus controls the first redistribution mechanism and the second redistribution mechanism in order to adjust the power difference by using the time differential of the requested amount of drive power.

* * * * *